United States Patent [19]

Janssen et al.

[11] 4,208,684
[45] Jun. 17, 1980

[54] DAMPER FOR CONSTANT LOAD ARM

[75] Inventors: Donovan M. Janssen; Raymond E. Kellow, Sr.; William A. Picker, all of Boulder; Anton J. Radman, Jr., Longmont, all of Colo.

[73] Assignee: International Business Machines Corporation, Armonk, N.Y.

[21] Appl. No.: 904,949

[22] Filed: May 11, 1978

[51] Int. Cl.² .............................................. G11B 5/48
[52] U.S. Cl. ................................................... 360/104
[58] Field of Search ................................ 360/102–104, 360/105–106, 128, 130, 133, 99, 78, 75

[56] References Cited

U.S. PATENT DOCUMENTS

| | | | |
|---|---|---|---|
| 2,618,710 | 11/1952 | Camras | 360/104 |
| 3,713,121 | 1/1973 | Fasano et al. | 360/103 |
| 3,725,884 | 4/1973 | Garfein | 360/103 |
| 3,774,183 | 11/1973 | Roscamp | 360/103 |
| 3,896,495 | 7/1975 | Beecroft | 360/103 |
| 3,931,641 | 1/1976 | Watrous | 360/104 |
| 3,984,872 | 10/1976 | Beecroft | 360/103 |
| 4,005,490 | 1/1977 | Duncan et al. | 360/103 |
| 4,034,412 | 7/1977 | Smith | 360/103 |
| 4,151,573 | 4/1979 | Tandon | 360/104 |

OTHER PUBLICATIONS

IBM/TDB, vol. 4, No. 3, Aug. 1961, pp. 13–14, "Rotating Recording Head" by Cronquist.

*Primary Examiner*—John H. Wolff
*Attorney, Agent, or Firm*—Herbert F. Somermeyer

[57] ABSTRACT

A head mount faithfully follows flexible media perturbations. The head mount consists of a pivoted rigid head support arm controlled by an offset spring having an offset damping and yieldably urging relationship to the rigid arm. The rigid arm acts as a free beam. The arm is pivoted to a record support radially movable with respect to a record disk.

6 Claims, 3 Drawing Figures

DAMPER FOR CONSTANT LOAD ARM

DESCRIPTION

TECHNICAL FIELD

This invention relates to head support assemblies for use with flexible disk files and the like and pertains more particularly to a head-arm assembly with particular damping means for providing enhanced response to media motion perturbations.

A prime object of the present invention is to provide an enhanced head-arm assembly which faithfully follows perturbations of media motions for maintaining enhanced transducer to record medium relationships.

Another object of the present invention is to provide a low cost head-arm assembly that still provides faithful following of record medium motion perturbations.

BACKGROUND ART

Prior art head-arm assemblies have included resilient spring support members which were biased to force a transducer into recording contact or to a recording proximity to a record storage medium. The resiliency of the support arm could result in vibrations of the arm that are transmitted to the transducer resulting in erratic motion of the transducer with respect to the record medium. In other support assemblies, damping material was pressed against an urging spring in a head support assembly. The spring would urge the head or transducer into a recording relationship with a record storage medium. In other head-arm assemblies, bifurcated springs were used to urge the head support arm assembly toward a record storage medium. Some of the assemblies did provide a sliding motion between a spring and another member for achieving diverse purposes. None of the prior art assemblies provided extremely high resonant frequency such that vibrations induced by a head-arm positioner or vibrations caused by the record medium did not result in undesired vibratory motions of the head-arm assembly.

Apparatus incorporating the present invention includes a head arm assembly having a free elongated rigid beam pivoted to a support and that is yieldably urged and its pivoting damped by a laterally offset yieldable force. In a preferred construction the yieldable bore is from a leaf spring rubbing on an upstanding boss. The rubbing contact is preferably adjacent the pivot.

BRIEF DESCRIPTION OF THE DRAWINGS

In the accompanying drawings forming a material part of this disclosure.

DISCLOSURE OF THE INVENTION

Figure 1:
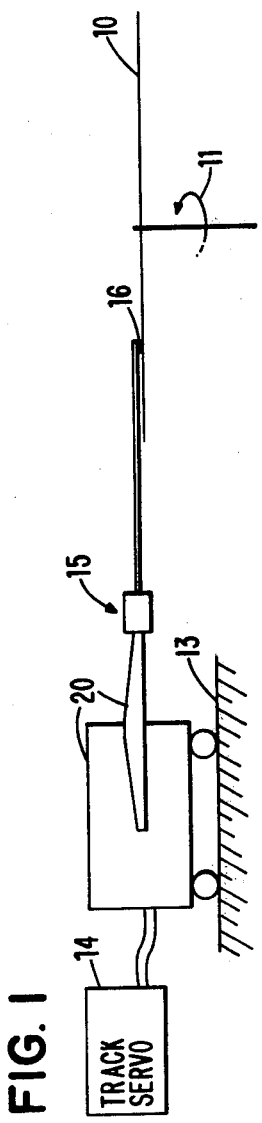
FIG. 1 is a diagramatic showing of a head-arm assembly and its relationship to a rotating flexible disk record media.

Referring now particularly to the drawing, like numerals indicate like parts of the structural features in the three views. Other objects and advantages of the invention can be obtained from a reading of this disclosure and to the appended claims in which the novel features of the invention are more particularly set forth.

A record storage disk 10 of the flexible media type rotates in the direction of arrow 11. Transducer assembly support carriage 12 is mounted on a frame 13 for radial motions with respect to disk 10. Carriage 12 is suitably controlled by a track servoing control system 14, as is known in the art. Carriage 12 supports a head-arm assembly 15 having a mounting portion at its free end to carry a transducer or head 16 in a predetermined transducing relationship to the flexible disk record storage medium 10. Head-arm assembly 15 is constructed such that transducer or head 16 faithfully follows the axial perturbations of flexible disk 10 as it rotates along a nominal plane. Not shown are recording and readback circuits which are usually electrically connected to transducer 16 for exchanging signals with flexible record disk 10. The signals so exchanged are preferably of the digital data type, but can be video, audio or any other form of electrical signals. Flexible disk 10 is preferably of the type that carries a magnetic recording coating; however, it can also be an optical disk or other types of recording.

Figure 2:
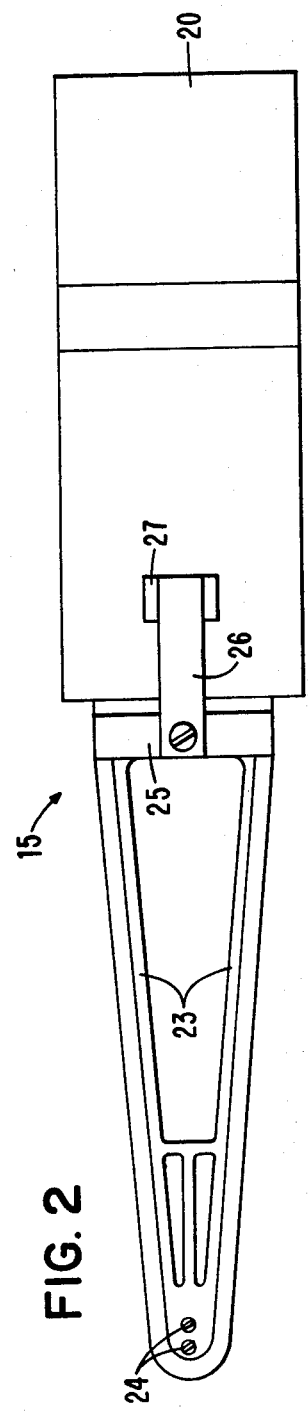
FIG. 2 is a diagramatic side elevational view of the head-arm assembly constructed using the principles of the present invention.
Figure 3:
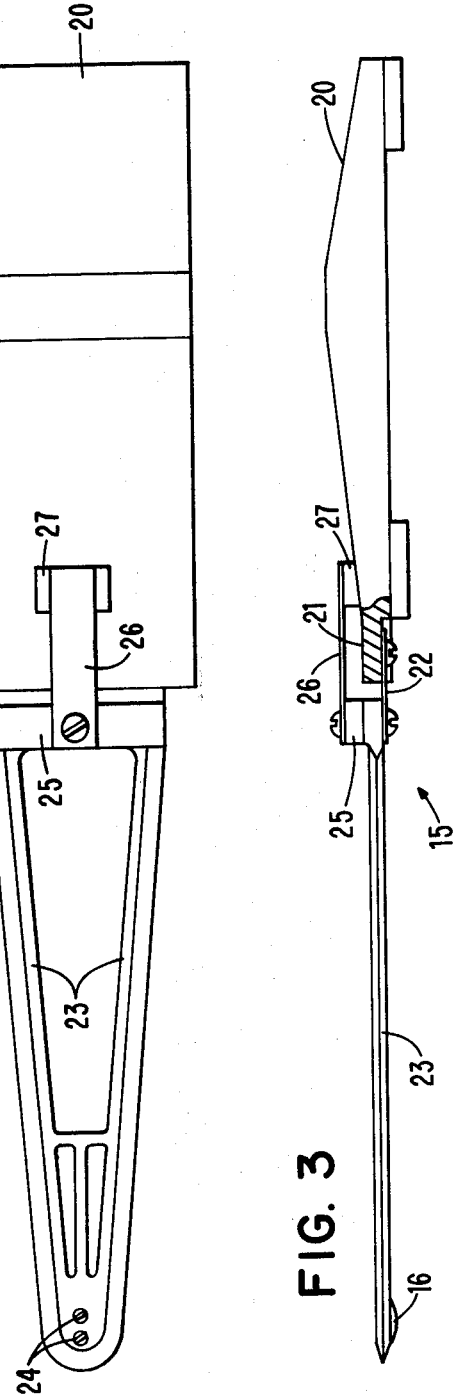
FIG. 3 is a diagramatic plan view of the FIG. 2 illustrated head-arm assembly.

FIGS. 2 and 3 illustrate the detail of the inventive head-arm assembly. Head-arm assembly 15 is preferably supported directly on carriage 12. Base 20 includes an outwardly projecting flange 21 to which a leaf hinge 22 is suitably attached. At the free end of leaf hinge 22, a rigid or hinged free beam head support arm (also termed beam) 23 extends outwardly for supporting transducer or head 16, as shown. A pair of recessed bolts 24 secure transducer 16 to the free end of beam 23. Beam 23 has a open interior for weight reduction, as best seen in FIG. 3.

At the inner-end of hinged free beam 23, shoulder 25 extends upwardly, as seen in FIGS. 2, 3, to support a preformed leaf spring 26. In accordance with the present invention, leaf spring 26 is disposed in a laterally offset relationship (out of the plane of beam or arm 23) as seen in FIG. 3 with respect to beam 23, as best seen in FIG. 3, and extends toward carriage 20 for engaging boss 27 in a predetermined rubbing contact. As hereinafter more fully described this contact damps vibrations of head-arm assembly 15. As shown, preformed leaf spring 26 extends from arm or beam 23 to base 20, no limitation thereto intended. Also, preformed spring 26 may take diverse shapes.

Preformed spring 26 not only provides damping in coaction with boss 27, but also resiliently urges free beam or arm 23 for forcing transducer 16 into a recording relationship with flexible record disk 10. It has been found that a most advantageous employment of the illustrated head-arm assembly is in a flexible disk file having a plurality of co-rotating axially separable flexible record disks. Such storage apparatus, as is known in the art, imposes severe dynamic requirements on any head-arm assembly particularly as to faithful following of axial media perturbations.

In a preferred constructed embodiment of the invention, spring 26 preferably should be performed in a shallow arc such that spring 26 is substantially flat when arm 23 is loaded with a desired force with respect to storage medium 10, i.e., for most effective damping, spring 26 should move along boss 27 in a rubbing contact while simultaneously yieldably urging arm 23 toward record storage disk 10. The resultant flat leaf spring 26 reduces bending moments induced by the damping force to enhance its operation as small axial displacements of transducer 16 results in rubbing contact damping-type motions of spring 26 along boss 27.

On the other hand, the design of leaf hinge 22 is non-critical. It could be a pin bearing or any other form of articulation. In any event, any motion of head 16 should result in some minor lengthwise motion to leaf spring 26.

Operation of the illustrated embodiment can be further adjusted by controlling the interaction of leaf spring 26 with boss 27. If such interface is not lubricated, then the coaction results in a Coulomb damper. On the other hand, if the interface is lubricated, then it behaves as a viscous damper. From all of the above described coactions it is seen that arm 23 should act as a hinged free beam between head 16 and leaf spring 26 and leaf hinge 22. The term "lubricated" is used in the usual preferred dictionary sense.

Several tests were conducted on the constructed embodiment for relating acceleration at head 16; i.e., the responsiveness of the head-arm assembly to enable head 16 to track the axial perturbations of record disk 10. The tests were conducted first without the coaction of spring 26 with boss 27 (i.e., undamped) and with the assemblage 26, 27. In the table below, the figure on the right side of the slash mark is the undamped test result, while the figure on the left side of the slash mark is the result with spring 26 coacting with boss 27. Various disk radii were employed, each radius being expressed in millimeters from the axis of rotation. As it turned out, a frequency of 320 Hz was a critical resonant frequency.

| AN EXEMPLARY TEST | | |
| --- | --- | --- |
| Disk Radius | Acceleration | Acceleration at 320 Hz |
| 140 | 3.6/6.6 | 1.0/5.6 |
| 110 | 2.1/4.6 | 0.5/1.6 |
| 80 | 2.0/3.0 | 0.4/1.1 |

To illustrate differences between leaf spring mounts and rigid or free beam mounts one should consider that a leaf spring in an assemblage similar to that shown in FIGS. 2 and 3 has a first resonance of 80 Hz, that is, if spring 26 uses its spring motion, it does not move on boss 27; hence, no damping action. Only when spring 26 slides, however slight, does laterally offset damping occur between spring 26 and boss 27. This extremely low resonant frequency will result in vibratory condition occuring in the head-arm assembly which is detrimental to the recording process. In contrast, a rigid or free beam had a first bending mode above 600 Hz. Then relating stiffness or rigidity to the square of the natural frequency, it can be said that the FIGS. 2 and 3 illustrated head arm is at least 50 to 60 times more rigid than a leaf spring mount which was tested. Ideally one would like to have beam 23 infinitely rigid; however, because of the constraints of weight, material availability and geometry of the arm, particularly as applied to multiple flexible disk files, this ideal is not achieveable in practice. In a practical sense, one needs rigidity to extend resonance to above 400 Hz.

The damping between members 26 and 27 is offset from the main line of the beam 23 thereby providing leverage action for enhancing the damping effect providing a more responsive and more stable head-arm assembly.

One alternative damping control at 26, 27 includes placing a pair of friction pads on opposite sides of member 26 and applying pressure thereto, such as by a constant force pressure block. This example, shows that diverse arrangements readily come within the scope of the present invention.

While we have illustrated and described the preferred embodiment of our invention, it is to be understood that we do not limit ourselves to the precise constructions herein disclosed or otherwise eluded to and the right is reserved to all changes, modifications coming within the true scope of our invention as defined in the intended claims.

Having thus described our invention, what we claim as new and desire to secure by Letters Patent is:

1. A head-arm assembly adapted to be mounted upon a carriage,
   a base member for mounting the head-arm assembly to the carriage and including a mounting portion, characterized in that:
   an elongated rigid beam member extends away from said mounting portion;
   pivot means for pivotably securing said rigid beam member to said mounting portion in a first plane,
   one of said members having a laterally offset means laterally offset adjacent said pivot means;
   spring-damping means rigidly secured to another one of said members and operatively connected between said base member and said rigid beam member via said offset means and including a friction sliding engagement with said laterally offset means for providing spring urging and damping functions between said base member and said rigid beam member along a plane offset from said first plane and said elongated rigid beam member.

2. The assembly set forth in claim 1 wherein said spring damping means is a preformed leaf spring.

3. The assembly set forth in claim 1 wherein said beam member includes an upstanding shoulder in proximity to said pivotal connection, and
   said spring damping means being affixed to said upstanding shoulder and extending in damping relationship to said base member.

4. The assembly set forth in claim 1 wherein said members respectively have an upstanding shoulder and an upstanding offset means and said spring damping means extending between said offset means and including said shoulder and being affixed at said shoulder and in rubbing contact with said offset means.

5. The assembly set forth in claim 4 wherein said spring damping means is a leaf spring preformed for facilitating damping rubbing action at small motions.

6. The assembly set forth in claim 5 wherein said leaf spring is affixed to said upstanding shoulder and in rubbing contact with said upstanding offset means, and
   said pivot means is a leaf hinge connecting said beam member to said base member adjacent said shoulder and to said outwardly extending flange.

* * * * *